(12) United States Patent
Hilerio et al.

(10) Patent No.: US 7,533,121 B2
(45) Date of Patent: May 12, 2009

(54) EXECUTING PAGES OF A GUIDED PROCESS APPLICATION IN PARALLEL

(75) Inventors: Israel Hilerio, Kenmore, WA (US); Shiqiu Guo, Sammamish, WA (US); Dharma Shukla, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 232 days.

(21) Appl. No.: 11/550,254

(22) Filed: Oct. 17, 2006

(65) Prior Publication Data

US 2008/0103860 A1  May 1, 2008

(51) Int. Cl.
G06F 17/30 (2006.01)
(52) U.S. Cl. .......................... 707/102; 707/101; 707/10
(58) Field of Classification Search ............... 707/10, 707/104.1; 726/5; 705/1, 26; 717/151, 174; 709/223; 714/38
See application file for complete search history.

(56) References Cited

U.S. PATENT DOCUMENTS

| | | | |
|---|---|---|---|
| 6,473,794 B1 * | 10/2002 | Guheen et al. ............... 709/223 |
| 6,529,905 B1 | 3/2003 | Bray et al. |
| 6,988,135 B2 | 1/2006 | Martin et al. |
| 7,149,698 B2 * | 12/2006 | Guheen et al. ................. 705/1 |
| 2002/0065848 A1 | 5/2002 | Walker et al. |
| 2002/0184402 A1 | 12/2002 | Gangopadhyay |
| 2003/0093758 A1 | 5/2003 | Dennison et al. |
| 2003/0229522 A1 * | 12/2003 | Thompson et al. ............ 705/4 |
| 2004/0003353 A1 | 1/2004 | Rivera et al. |
| 2005/0044518 A1 | 2/2005 | Petunin et al. |
| 2005/0193269 A1 * | 9/2005 | Haswell et al. ............... 714/38 |
| 2005/0240428 A1 | 10/2005 | Gabrick et al. |
| 2005/0289454 A1 | 12/2005 | Donelson et al. |
| 2008/0148367 A1 * | 6/2008 | Hilerio et al. .................. 726/5 |

OTHER PUBLICATIONS

Pageflex Edit Product Summary, copyright 2005, Bitstream, Inc. [online] [retrieved on Aug. 31, 2006]. Retrieved from the Internet: URL: http://www.bitstream.com/publishing/pdfs/041018_edit.pdf.
YBServices, [online] [retrieved on Sep. 11, 2006]. Retrieved from the Internet: URL: http://www.ybservices.com/showpage.php?p_id=0018.
iSummation Technologies Content Management System—Feature List, [online] [retrieved on Aug. 31, 2006]. Retrieved from the Internet: URL: http://www.isummation.com/plugins/docs-download/14/content_management_all.pdf.

* cited by examiner

Primary Examiner—Diane Mizrahi
(74) Attorney, Agent, or Firm—Workman Nydegger (57) ABSTRACT

One or more users can execute tasks in a guided process involving dependent and independent steps modeled with parallel processing techniques. For example, a user can open one or more parent pages in a guided process through a user interface, where each of the one or more parent pages lists several items (e.g., child pages) to be completed. Each listed item (i.e., child page) may or may not depend on processing of another child page, or of another task on the parent page itself. As the user (or multiple users) completes the various items on each given parent page according to page-specific definitions, each parent page is rendered anew to show what has been completed and what remains to be completed. Thus, the parallel execution of tasks can be combined with the sequential execution of other steps to provide an integrated experience to the end user.

20 Claims, 4 Drawing Sheets

EXECUTING PAGES OF A GUIDED PROCESS APPLICATION IN PARALLEL

CROSS-REFERENCE TO RELATED APPLICATIONS

N/A

BACKGROUND

1. Background to Relevant Art

As computerized systems have increased in popularity, so have the needs to create and manipulate information, as well as complete electronic transactions or reports using computerized systems. In general, many electronic transactions are initiated and completed as part of a process-based application (also referred to as a "workflow," "process," or "business process"). Many process-based applications (i.e., "guided process" applications) follow a "wizard" style format, in that they require the user to finish a number of steps in a particular process sequence before the user exits the application interface or the computer system, or before saving progress.

For example, a web-based guided process application for online purchases might require a user to complete or execute one or more steps in a particular sequence, such as enter address information, credit card information, and the like. The web-based guided process might then submit the entered information to a central hub for processing. In some cases, the sequence may be dictated by links embedded within the presented page, while in other cases, the page sequence may be dictated by coding in the specific guided process application that processes information received from the pages. In this example, the entire process can be entered and submitted by a single user. Other, more complex transactions, however, may be less intuitive for wizard style processing, such as transactions that involve entries, submissions, or verifications from other parties.

For example, a bank might provide an internet/web-based guided process application for completing a loan application. To complete the loan application, the bank might provide a certain web-based guided process application that asks the user to login through a web browser, and then enter data into sets of web pages presented in a particular sequence. The guided process might then display first a personal information page, and then verify the entered contents before presenting a next page in the sequence. For example, the guided process might submit a user's entry to a central verification hub and, if validated, only then display a subsequent page for a user to enter the amount of the loan, and/or perhaps the intended use for the loan. Such a sequence of pages might be dictated in part by certain definitions of the guided process, or navigation logic built into the initially displayed pages themselves.

In some cases, each page in user interface may not be complete until another user or third party has a chance to perform some additional verifications. Since process-based (or wizard-style) applications do not typically have a concept of "multiple simultaneous users," however, and/or otherwise rely on specific ordering, an institution may break up a particular transaction into multiple different wizard style applications. With respect to the above-described loan application, for example, the bank may require a loan officer to perform some action on data submitted by the user with a different wizard-style application program. For example, the user's web-based loan application might prepare and submit a summary sheet, which the loan officer, in turn, might amend, change, or approve using a different web-based guided process application.

In addition to these problems, one will appreciate that a number of the above-described steps may not necessarily depend (or follow) from each other. For example, if a user were filling out a loan application by hand on paper, the user could enter bank account information before entering personal contact information, and vice versa, so long as the user writes in all the required fields before submitting the application. Another advantage of the handwriting approach is that the user can easily stop and return to the loan application, and easily identify what still needs to be entered on the paper.

As previously described, however, guided process-based applications generally require steps "$A_{(1-n)}$" to be entered before presenting a next set of steps "$A_{(n,n+1)}$" in a new page display. In addition, since such guided process applications generally do not have a concept of "multiple simultaneous users," there are difficulties when needing certain page data to be validated by another user before proceeding.

In particular, this sort of page-by-page sequential processing and validation can make it difficult for a user to measure progress in a particular transaction, and/or to see how far the user may still need to go before completion. For example, links within a parent page to specific "child" pages that need to be completed may still be displayed to the user within the parent page even after the user has completed the referenced child pages. With respect to the above-described loan example, a first page displayed by a web application might include several internet links to other pages that need to be completed by a user or a group of users, and/or by a third party user (e.g., a loan officer). Most guided process-based applications would allow the user (or third-party user) to click on any one of the links and fill out information on that page, and then submit that child page.

Unfortunately, there is no efficient mechanism for sharing the transmitting of an execution context of the child page with the parent page. As a result, when the user returns to the original parent page, the parent page display may not make clear to the user that the user successfully completed a particular task, such as filling out one of the required child pages. Although it is sometimes possible to infer whether or not a task is done by detecting data changes, such an approach tends not to be accurate, particularly if the task does not modify any data.

In particular, there is no available mechanism for the parent page to detect changes in the state of a child page, which could provide a more accurate insight into what actions the user has performed during the guided process. Thus, the only clue the user might be able to derive about having finished one of the child pages is that the link to the child page (in the case of using hyperlinks) might be colored differently. Such an indication, however, typically tends to suggest that the user only visited the child page, regardless of whether the user successfully completed filling out or otherwise executing some part of the child page.

Accordingly, there are a number of difficulties that can be addressed in guided process-based application programs, and corresponding page navigation techniques.

BRIEF SUMMARY

Implementations of the present invention provide systems, methods, and computer program products configured to implement parallel processing in User Interface driven, guided process-based applications, which in turn drive users efficiently toward necessary tasks to complete. For example, at least one implementation of the present invention includes presenting within a user interface a page containing one or more sets of references to one or more different child pages.

The sets of one or more child pages may involve additional execution by a particular user of the main page, or even a third party user. As one or more execution rules are satisfied for the set(s) of one or more child pages, by whoever is authorized to execute them, the original parent page of the process display is automatically changed to indicate that the particular child page has been executed/completed. In at least one implementation, for example, a reference to a completed child page is removed from the display of the main parent page, thus indicating that the task was completed.

Thus, for example, a method from the perspective of a client computer system/user interface can involve sending one or more requests to a process engine to open a guided process. In general, the one or more requests can include user identification information for a user. The method can also involve receiving rendering information from a process engine for a parent page of a process instance associated with the guided process. In such a case, the parent page will include one or more child page references.

In addition, the method can involve sending one or more input selections for a child page corresponding to at least one of the one or more child page references found on the parent page. Furthermore, the method can involve sending input on the selected child page, wherein the input satisfies one or more user input data fields in the child page. Still further, the method can involve, upon sending a request to navigate back to the parent page of the process instance, receiving alternate rendering information that displays the parent page but indicates that the child page corresponding to the at least one child page reference has been completed.

By contrast, a method from the perspective of a process engine can involve receiving one or more user requests to create a process instance of a guided process. The method can also involve sending rendering information for a page of the process instance to a client computer system, where the page includes a displayed reference to a plurality of child pages. In addition, the method from the perspective of the process engine can involve receiving from the client computer system one or more user inputs regarding at least one of the plurality of child pages. Furthermore, the method can involve, upon receiving a navigation request from the client computer system to return to the parent page, sending alternative rendering information for the page indicating that the criterion of the child page has been satisfied.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Implementations of the present invention extend to systems, methods, and computer program products configured to implement parallel processing in User Interface driven, guided process-based applications, which in turn drive users efficiently toward necessary tasks to complete. For example, at least one implementation of the present invention includes presenting within a user interface a page containing one or more sets of references to one or more different child pages. The sets of one or more child pages may involve additional execution by a particular user of the main page, or even a third party user. As one or more execution rules are satisfied for the set(s) of one or more child pages, by whoever is authorized to execute them, the original parent page of the process display is automatically changed to indicate that the particular child page has been executed/completed. In at least one implementation, for example, a reference to a completed child page is removed from the display of the main parent page, thus indicating that the task was completed.

As will be appreciated more fully herein, implementations of the present invention can support the creation of large, complex applications at least in part by supporting a wide range of workflow/process modeling constructs to express navigation logic. In one implementation, for example, such constructs can include definitions of a guided process, which have "and" branches (e.g., to support a "parallel activity,") as well as "or" branches (e.g., to support a "listen activity"), and others. In addition, implementations of the present invention support the notion of a "user" and the ability to associate a specific activity to an individual user. This can allow various components in a page to be processed by multiple different users as may be needed for a particular guided process.

Implementations of the present invention can also be understood to define a new type of "state machine," which generally poses no restriction on child pages, and thus can allow virtually any type of existing workflow/process activity to be used inside a given page (parent, child, or otherwise). In one particular implementation relating to sequential navigation, activities/tasks used or referenced inside any given page can be dynamically enhanced with a property (per a guided process's definitions) that defines such things as "possible transitions" between child pages and/or between child and parent pages. In this example, one or more components or modules can comprise a "possible transitions" property (or "process definition") within a given guided process. This property can be used to determine a next step to be followed once a user has successfully executed a given activity (or child page).

As will be understood more fully herein, this generalized architecture and corresponding properties can provide a number of different task completion possibilities within a user interface. In a single user scenario, for example, a user can execute various tasks using "parallelism," which refers to a situation in which a user has several tasks that need to be completed before being allowed to continue or move forward. In a multi-user scenario, however, parallelism may mean that there are several tasks that will be executed by different users or individuals (at least approximately simultaneously in some cases). In accordance with at least one implementation, therefore, each user (single or multi-user environment) may be expected to execute only the tasks that belong to their particular user identity. As such, an "activity" or "task" can be defined at least in part with respect to whether a user identity is allowed or otherwise intended to perform some action on the activity or task.

Figure 1A:
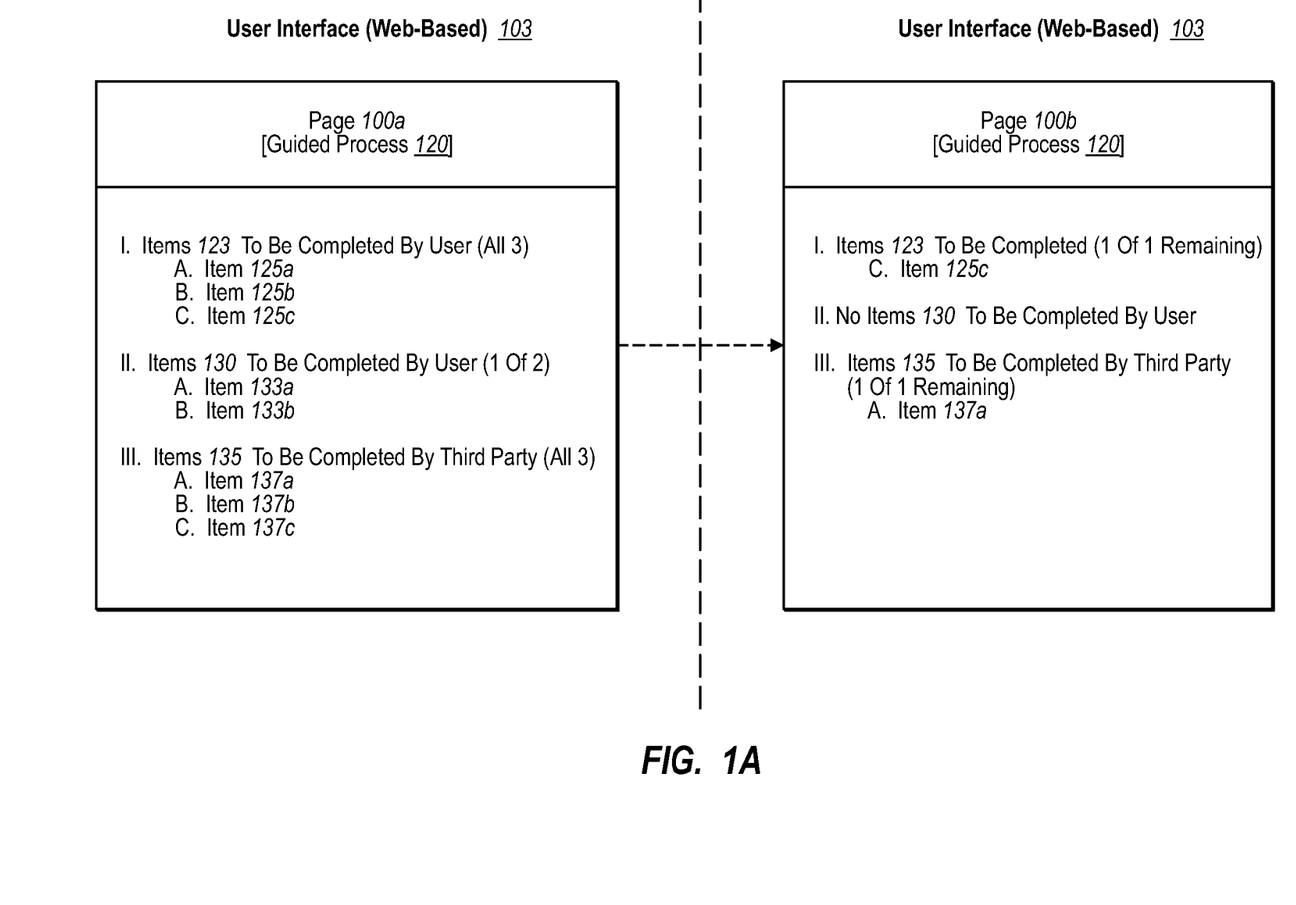
FIG. 1A illustrates differing views of a page display in accordance with an implementation of the present invention before and after user input has been executed in a guided process.

Turning now to the Figures, FIG. 1A illustrates two renderings of a "page" (i.e., renderings 100a/b) displayed through a user interface 103. As used herein, a "page" generally represents a set of rendered (or render-able) data that is viewable (or intended to be viewable) through a particular user interface. Furthermore, the page may be one of several other pages that form part of a group of steps or tasks to be completed. Each of the one or more pages in the guided process will often have (or reference) a set of one or more sub-tasks (i.e., "child pages") to be completed or otherwise executed by a given user. As such, a "page" is also used interchangeably with a "task," or "activity." In particular, a page that contains one or more references in the form of buttons, hyperlinks, or other selectable elements therein can be considered a "parent page," and each task to be executed (or reference to a next page) would be termed herein as a "child page." Of course, any given parent page in a guided process may also be termed a child page with respect to an earlier parent page in a given guided process application.

In any event, FIG. 1A illustrates a situation in which a first version of at least one page (100a)—based on a guided process application (or, simply "guided process") 120—is rendered or displayed through web-based user interface 103 prior to user interaction. FIG. 1A further shows that this same page is rendered differently as page version 100b after a user's interaction with certain tasks in page 100a (i.e., child pages referenced by parent page 100a). In general, FIG. 1A shows that page 100a is rendered or displayed through an internet-enabled user interface 103. For example, user interface 103 may include a web browser, or a client or server web-based application that is implemented through a web browser.

Alternatively, user interface 103 can be a rich, desktop-style user interface, such as a web-enabled (e.g., capable of rendering/displaying HTML, XML, whether streamed over a network connection or simply retrieved from local storage) word processing or spreadsheet type of client user interface. Regardless, user interface 103 is configured to display web content. Accordingly, the items (i.e., tasks/child pages) referenced and displayed within a given page 100a will generally be displayed as any type of "selectable" item, such as an underlined hyperlink, selectable button or image, or other types of web-based selection items.

In particular, FIG. 1A shows that user interface 103 has rendered page 100a with various items (i.e., tasks, references to child pages, activities, etc.) in accordance with guided process 120 "definitions." The definitions for a given guided process generally define or instruct the navigation of one or more parent/child page relationships in a group of activities, such as whether child pages of any given one or more parent pages need to be executed/completed in sequence, in alternative form, or as part of some set of pages in accordance with some other rules. On a practical level, for example, guided process 120 might be a loan application with several different steps (or parent pages), and each set of items (e.g., 123, 130, 135) represent several sub-tasks/actions (or separate child pages) that need to be completed for each given parent page. For example, some child activities on a given parent page may need to be completed by a loan applicant, while other child activities on the same or another parent page may need to be completed soley by a loan officer (i.e., "third party.")

As a preliminary matter, one will appreciate that each given page in the guided process (e.g., 100a) could be displayed differently for any given user, depending on the types of tasks needed to be completed. For example, rather than rendering a display of tasks both for the loan applicant user and the loan officer user (e.g., page 100a in FIG. 1A), the rendered page could display only the first and second sets of items 123, 130 for the loan applicant user. Similarly, the loan officer user's page display might show only the third set of items 135. Accordingly, one will appreciate that each page can be tailored to the needs of a given user.

In any event, FIG. 1A shows that page 100a includes a reference to a first set of items 123 to be completed by a user, with further indication that the user needs to complete "all three" of items 125a, item 125b and item 125c (i.e., subject to an "and" operator in the process definitions). For example, item 125a might reference a child page in which the user enters various information delineating a purpose for the loan. By contrast, item 125b might reference a child page in which the user enters various collateral information for the loan, and item 125c might reference a child page for entering cosigner information, and so on. Thus, the first set of items 123 are governed by a rule in guided process 120 that says that all sub-items need to be completed.

As will be understood more fully herein, however, once a user has satisfied or successfully executed/completed a given task (e.g., filling out a child page), user interface 103 can update the parent page to reflect the number of items to be completed, in accordance with the appropriate rules. Thus, one will appreciate that the rules/definitions of guided process 120 can be varied widely to include a wide range of execution contexts and steps. For example, FIG. 1A also shows that user interface 103 has rendered a second set of items 130 for page 100a, of which the user/loan applicant only needs to complete "1 of 2" (i.e., subject to an "or" operator in the definitions of a guided process). For example, items 133a and 133b might represent alternative child pages or tasks, such as information regarding selection of a real estate agent, or information regarding other details if selling or purchasing a property strictly without a real estate agent.

As previously mentioned, implementations of the present invention further include the ability to have multiple users execute or complete user-assigned tasks on a rendered page. This can be done by associating a user identity (e.g., user name, digital certificate identifiers, etc.) with a particular item/task, and then differentiating task input received by the particular user creating the input. As such, FIG. 1A shows that rendered page 100a includes a reference to a third list of items 135 to be completed by a third party, in which all three of items 137a, 137b and 137c (i.e., subject to an "And" operator) need to be completed. For example, items 137a, 137b, and 137c might each represent various aspects of guided process 120 where a loan officer, or the loan officer's manager, might need to approve various specifics of the loan independently of the other user's (e.g., loan applicant's) input.

Thus, FIG. 1A shows that a web-enabled page (e.g., 100a) can include a number of items that can be executed simultaneously through the same parent page (i.e., 100a) by different users, and at the same time. Despite executing multiple tasks simultaneously, implementations of the present invention further provide the ability to easily update page 100a to reflect the various execution contexts for the page. For example, FIG. 1A also shows that after the user (e.g., loan applicant) and the third-party user (e.g., loan officer) have executed at least some of the above-mentioned list items, user interface 103 receives and renders different rendering information in the form of updated page 100b. That is, once certain execution parameters have been satisfied for process 120, state is updated for an instance of the guided process (e.g., 120), or "process instance."

As used herein, a "process instance" (e.g., 165) is simply the user/session-specific execution of a guided process (e.g., 120, 127), and generally comprises the execution and rendering of a set of one or more wizard driven "pages" and/or corresponding data associated with a set of particular process definitions for the given guided process. One or more components or modules at process engine 110 execute and process the process instances.

In any event, user interface 103 receives and renders new rendering information based on the updated state for process instance 165, where the new rendering information removes or otherwise signals to the user that particular items have been completed. From any appropriately-authorized user's perspective, this can simply appear as one or more changes to the main parent page (which the user may have addressed through a web browser), rather than, necessarily, receipt and processing of a new web page. This can be the case whether it is the loan applicant user, in this example, or the loan officer user, or whether rendering the given pages (100a/b) in a variety of different computer systems or user interfaces.

In general, the changes or signals/indications telling a given user what remains can be done any number of ways, and using any number of mechanisms/components. In one implementation, for example, the new rendering information might include check marks (or other text/images) beside a particular item, which clearly indicate that the item (or set of items) has been completed, and thus need no further action. In other cases, the new rendering information for the page (i.e., displayed as 100b) might omit certain items that a user has successfully executed or completed.

For example, FIG. 1A illustrates that user interface 103 renders the page (now 100b) to show that only "1 of 1" items remain (i.e., 125c) to be completed for the first set of items 123, and omits the display of items 125a-b. Similarly, user interface 103 renders page 100b to show that none of the second list of items 130 remain to be completed (i.e., one or both of items 133a-b were successfully completed), at least in part by omitting items 133a-b. Furthermore, user interface 103 renders page 100b to show that the third-party user still needs to complete "1 of 1" of items (137a) of the third set of items 135, and thus omits the display of items 137b-c.

At least in part because the rendering of a given page through the user interface can be dictated by the present state of an instance of a guided process (e.g., 120), any authorized user can close a user interface (e.g., 103) at any point, and then continue the process (e.g., 120) midstream. For example, the user (e.g., loan applicant) can close user interface 103 at one location, and then reopen and render page 100a/b through an appropriate user interface (e.g., web interface 103, or other) at another location or at another point in time. In either case, the user's particular user interface will ultimately render information dictated by guided process 120, which rendering information is based on the current state of an instance of the guided process.

Figure 1B:
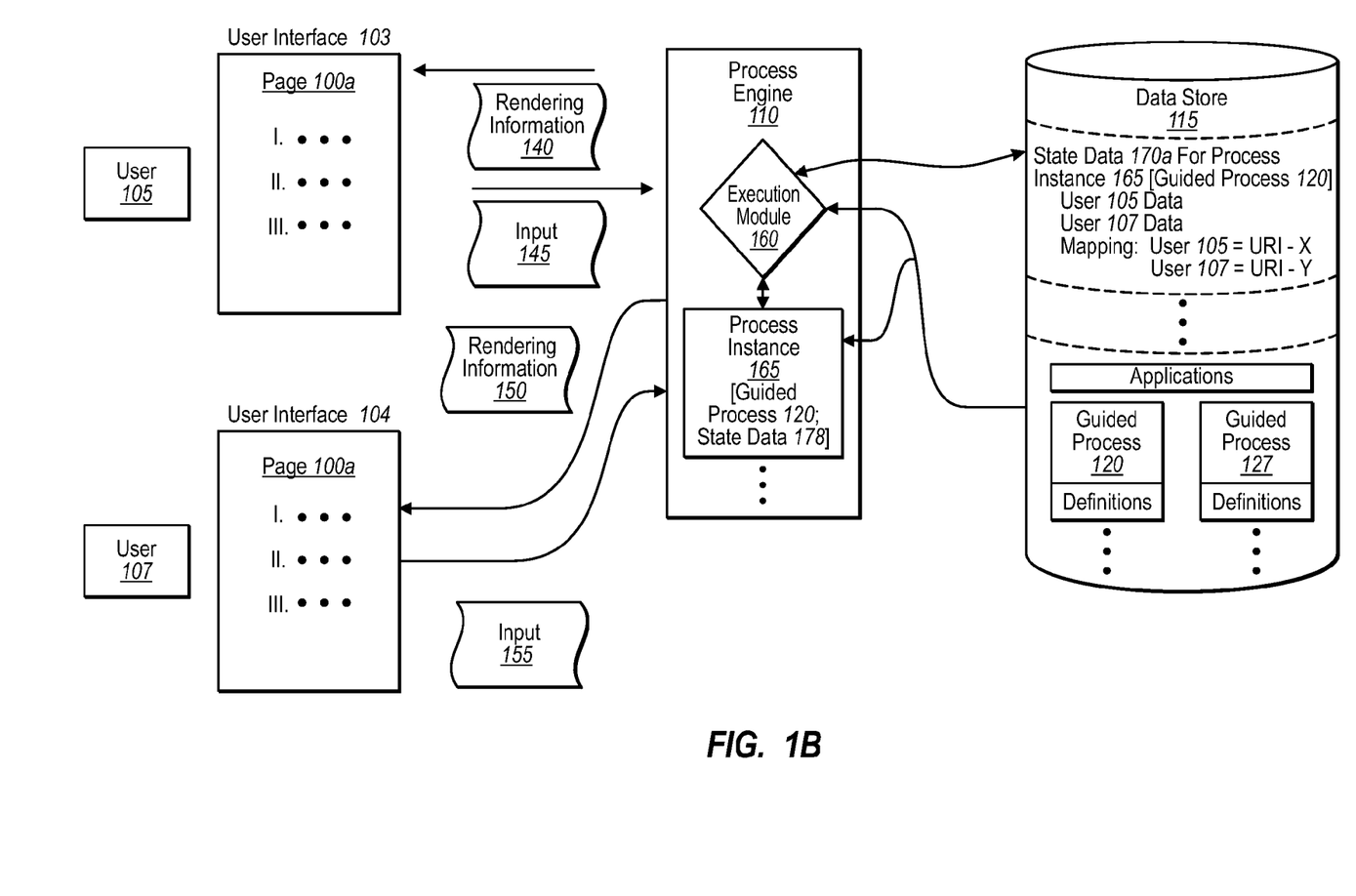
FIG. 1B illustrates an overview schematic diagram in accordance with an implementation of the present invention in which two users open pages pertaining to the same process instance of a guided process through a process engine, and enter input thereto.

FIG. 1B provides an overview schematic diagram showing additional details regarding communication of the guided process described and illustrated with respect to FIG. 1A. In particular, FIG. 1B illustrates architectural details regarding how the display of a particular page (e.g., 100a) can be modified in accordance with progress in particular guided process, such as a wizard-style application program. For example, FIG. 1B shows that user 105 (e.g., a loan applicant) is interacting with page 100a, as illustrated in FIG. 1A, and that user 107 (e.g., a loan officer, or other third party) is also interacting with page 100a through a different computer system and/or different user interface (e.g., 104). FIG. 1B further shows that each user interface 103, 104, in turn, is in communication with process engine 110. Process engine 110 can be a remote component or module that is accessible primarily over a network by a given user interface, or can also be a locally-installed set of components or modules at a user's client computer system.

In particular, process engine 110 can comprise any number of type of components/modules for opening and executing a particular runtime of a given process, and then sending appropriate rendering information to a requesting user interface. For example, FIG. 1B shows that process engine 110 comprises an execution module 160, which includes one or more components configured for any number of functions, or to still interact with any further components (e.g., components provided in process definitions). In particular, process engine 110 communicates with data store 115 to identify the definitions corresponding a particular requested guided process (e.g., 120, 17).

In one implementation, the guided processes 120 and/or 127 (and corresponding definitions) can comprise a process-specific "navigator component" that dictates which pages need to be executed in which particular context or order, as well as whether pages need to be processed together, or in an alternative context, etc. The navigator component can further dictate which child pages should be linked to which parent pages, or how a parent page should be displayed in particular execution contexts. The navigator component can still further dictate to what child page a parent page should link after one or more child pages are executed or completed by any particular user.

To these ends, the navigator component can include a number of built-in properties, which are at least partly understood as simplified state machine activities. For example, each child page/activity (e.g., items 125a or 125b) inside the navigator component can represent a state, which can be considered "blocking" or "non-blocking." If a particular child page/activity blocks for user input, the child activity can be considered as a "blocking state"; otherwise the child activity/item can be considered as a non-blocking state. For example, the navigator component could be configured to become idle when reaching a blocking state. At such a point, querying for current interactions might cause the navigator component to return the currently-blocked interactive activities.

The navigator component can also be configured to attach each child activity with a "possible transitions" property. This possible transitions property can be understood in one implementation as a collection of objects, which, in turn, model a link between activities. In particular, the possible transitions property can be configured to represent a potential transition between a parent page and a child page/activity. In one implementation, for example, each possible transition can include an associated "condition," which process engine 110 may evaluate at runtime. The first possible transition whose condition evaluates to true becomes the actual transition. The target of the actual transition becomes the next activity to be executed.

In general, guided processes that dictate a particular sequence of pages can be implemented using a navigator component, which contains "interaction activities" that "block" and wait for input. Once the input is received, the interaction activity notifies the navigator component, which then determines which interaction activity needs to execute next (i.e., in a sequential fashion).

By contrast, guided processes based on parallel page execution contain interactive "group activities" inside the navigator component. These group activities (e.g., the parent page containing references to child pages/activities) "block" and wait until all of its child interactive activities receive input and are completed. Once all the child interactive activities contained by the interactive parent/group activity are completed, the interactive parent/group activity is marked as completed, and control is passed back to the navigation component. This allows the navigation component to identify which of its interactive activities (child or parent) need to execute next. Along these lines, therefore, any given guided process can be configured to implement a pause/continue behavior.

An interactive activity can further have an input, an output, an error string if validation fails, and can define a user who can interact with it. In one implementation, an interactive activity receives an input message through a message queue created during its initialization process. The name of the message queue may be the same as the name of the activity. When an interactive activity starts to execute, it first checks to see if a message is available in the queue. If a message is available, the interactive activity might pick up the message and continue to execute its children (if there are any.) If a message is not available in the queue, the interactive activity might then subscribe to the "message arrive" event, and blocks the execution. The execution continues when a message arrives in the queue.

In accordance with such properties, therefore, when receiving user input to select a particular child page/activity, the navigator component of a given process instance (e.g., 165) can evaluate each possible transition at runtime. The navigator component can further evaluate the order of parent/child object's position in the collection of objects, and thus determine to which next page (child or parent) to navigate (and send appropriate rendering information). In one implementation, the first possible transition that evaluates to "true" becomes the "active" link, and the navigator component can then move to the appropriately-referenced child page/activity.

In additional or alternative implementations, however, the navigator component may not manage the transitions between the parent and the child pages. Rather, the navigator component may be configured primarily to see the relationship between top-level activities (i.e., the relationship between the parent activities, or activities that have no children). In one such implementation, therefore, the parent/children relationship can be captured by a particular type of interaction activity, called an "interaction group activity." Each "interaction group activity" can be set up to correspond to one parent page with links to one or more child pages. In one implementation, the "interaction group activity" may have one or more child activities that are interaction activities. Each one of these activities, in turn, can correspond to one child page. In this case, the rules/conditions that govern the execution of child activities may be defined on the "interaction group activity," rather than the above-described navigator component.

Referring again to the Figures, FIG. 1B shows that data store 115 can comprise one or more volumes or partitions for storing state data corresponding to an instance of a guided process (e.g., 120, 127), as well as one or more users' participation in the process instance. This user data at data store 115 can further include mapping information that indicates the Uniform Resource Identifier ("URI") for a given user (e.g., via mapping a username and password to a URL of a user's computer, a URL for which a particular input was received, etc.)

Accordingly, when a user (e.g., user 105) opens an instance of a guided process application, the user (via user interface 103) contacts process engine 110. Process engine 110, such as via execution module 160, then contacts data store 115 to identify the definitions/components (including a navigator component) of the requested guided process. The information retrieved from data store 115 can include one or more instructions regarding what (or how) to render information for a particular process instance of the guided process. Process engine 110 then processes this information to create process instance 165.

In general, process instance 165 can include a locally-executed instance of process 120, which is created based on a combination of process 120 definitions/components, as well as data supplied by a given user through the user's particular user interface. Upon creating a given process instance, the process engine 110 can then send user interface-specific rendering information to the requesting user. For example, FIG. 1B shows that process engine 110 delivers rendering information 140 to user 105, and also delivers rendering information 150 to user 107, where rendering information 140 and 150 are customized for user interfaces 103 and 104 respectively.

User interface 103 may be a web-enabled process based on one operating system, while user interface 104 might be a web-enabled process (or other type of user interface technology) built on another operating system. Thus, process engine 110 can provide appropriate rendering information to ensure user 105 and 107 see page 100a as shown in FIG. 1A, regardless of the type of user interface technology, or location of the computer system, etc.

At various points, users 105 and/or 107 will provide input to page 100 via user interfaces 103 and 104, respectively. For example, with respect to FIG. 1A, input 145 might reflect one or more input and output requests/responses where user 105 completed (or properly executed) tasks on the child pages referenced by items 125a, 125b, and 133a or 133b. Similarly, input 155 might reflect one or more input and output requests/responses where user 107 completed (or properly executed) tasks on the child pages referenced by items 137b, and 137c. For example, FIG. 1B shows that user 105 and user 107 send input 145 and 155, respectively, to process engine 110.

Figure 1C:
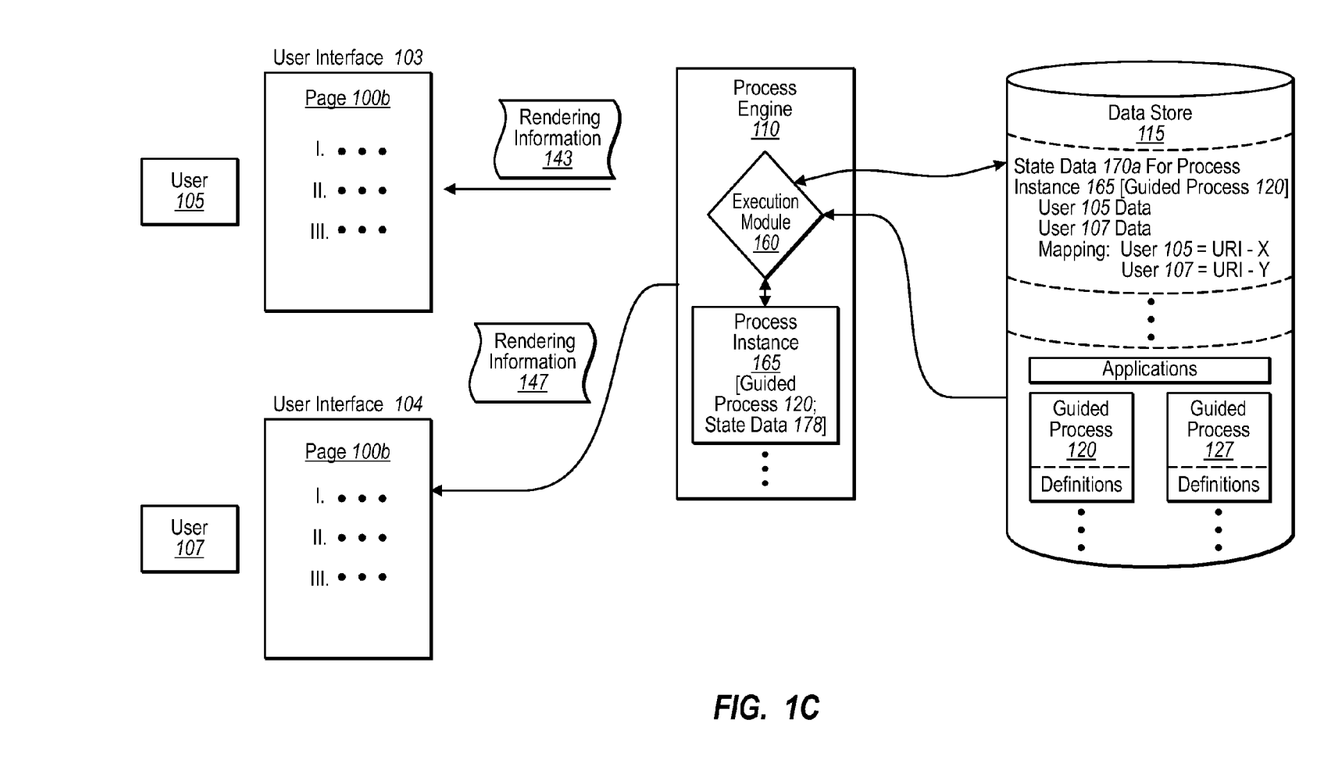
FIG. 1C illustrates the overview schematic diagram of FIG. 1B, in which the process engine processes/executes the earlier-received user input and sends updated rendering information for the same initial/parent page of the guided process.

As shown in FIG. 1C, process engine 110 processes the input 145, 155 from users 105 and 107 in the context of the definitions in process instance 165. In this example, this results in process engine 110 then sending updated rendering information 143 and 147 to users 105 and 107. As previously mentioned, the updated rendering information 143, 147 shows (when displayed) what tasks/child pages have been completed or executed properly in the guided process application, and/or which tasks/child pages remain to be completed, regardless of the particular user that completed a particular task. For example, FIG. 1C shows that the updated rendering information causes users 105 and 107 to receive and display page 100*b*, such as also shown in more detail in FIG. 1A.

FIGS. 1C (and 1B) also show that process engine 110 can periodically update the process instance 165 to reflect the current state of input via data store 115. For example, FIG. 1B illustrates state data 170*a* for process instance 165 prior to receiving state for the latest round of inputs 145, 155 from users 105 and 107 respectively. By contrast, FIG. 1C illustrates data store 115 after process engine 110 has updated or applied the received inputs for process instance 165. For example, FIG. 1C shows that data store 115 has updated state data 170*a* to 170*b*. State data 170*b* thus reflect that input 145 has been received for user 105 and that input 155 has been received for user 107 in process instance 165. Notably, FIG. 1C also shows that process engine 110 can update process instance 165 based on the updated state data 170*b*.

As a result, if user 105 or user 107 ever exited their corresponding user interface 103, 104, the user could easily log back in through process engine 110. Process engine 110 could then, in turn, pull the current state of the previously created process instance 165, and recreate that process instance for present use. For example, user 105 (e.g., a loan applicant) might close user interface 103 after completing a number of steps in each of item sets 123 and 130, and await completion of items 135 by the third-party user 107. At any point, user 105 could simply log back into page 100(*a/b*) through user interface 103 (or using a different rich client user interface at the same or different computer system). User 105 could then receive updated rendering information from process engine 110, which would be based on the present state (e.g., 170*a* or *b*) of the process and thus convey what items remain to be completed by the user or third-party user.

Accordingly, FIGS. 1A through 1C illustrate a number of components and modules for managing guided process-based applications in the context of input from one or multiple users. FIGS. 1A through 1C and the corresponding text further illustrate how at least one page in a group of pages defined by a guided process can implement parallel processing. In particular, one will appreciate that, although one page is shown primarily for convenience, a user implement parallel processing by executing multiple parent pages and multiple child page activities or references within each of the multiple parent pages. Furthermore, multiple other users may be executing various of the child pages referenced by each of the multiple parent pages at the same time that the user is executing one or more multiple parent pages (and/or corresponding child pages/activities referenced therein).

Figure 2:
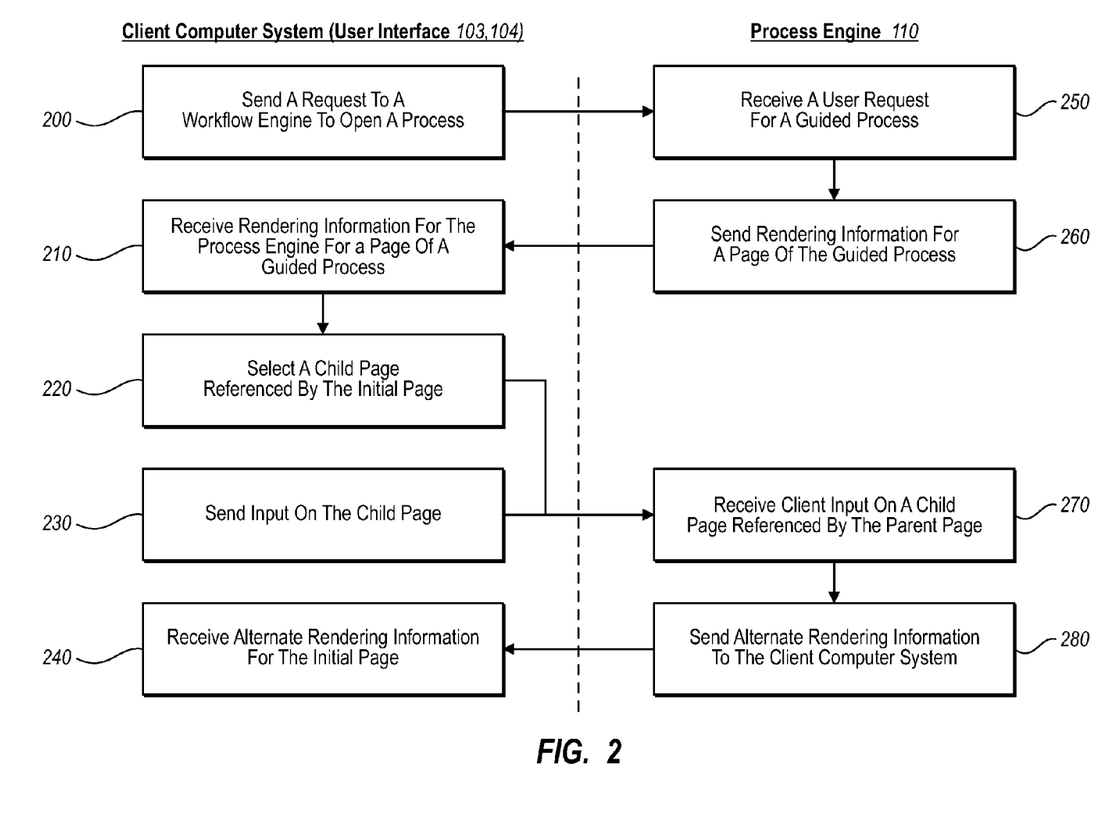
FIG. 2 illustrates flowcharts of methods comprises a series of acts from the perspective of a client computer system and a process engine for executing and/or rendering tasks of a page using parallel processing techniques.

In addition to the foregoing, one will appreciate that implementations of the present invention can also be described in terms of flow charts comprising a series of one or more acts in a method for accomplishing a particular result. For example, FIG. 2 illustrates a method from the perspective of process engine 110 and of data store 115 for executing one or more requests on a page of a process in a parallel fashion, such that page navigation indicates clearly what tasks will next need to be performed by a particular user. The methods described below for FIG. 2 will also be described with respect to the components and diagrams illustrated in FIGS. 1A-1C. As a preliminary matter, reference herein to the terms "initial," "subsequent," "first," or "second" is made primarily to distinguish claim terms from one another, and not necessarily to suggest or imply a particular sequence or order, unless specifically stated.

In particular, FIG. 2 shows that a method from the perspective of a client computer system (i.e., hosting user interface 103, 104) comprises an act 200 of sending a request to a process engine to open a guided process. Act 200 includes sending one or more requests to a process engine to open a guided process application, wherein the one or more requests include user identification information for a user. For example, user 105, 107 opens user interface 103, 104, which may be an internet browser, or other type of rich, desktop style process, and then connects to process engine 110.

The user then sends one or more requests to process engine 110 requesting the opening and execution of a particular guided process application that includes a number of steps to be completed. Each of these steps, in turn, can be represented by a number of one or more parent pages (sequential in some cases), which, in turn, further reference one or more child pages to be completed. For example, the user opens up a loan application or an expense report to be filled out, or initiates an online purchase. Any or all of these can include a number of parent pages (i.e., steps in the guided process), which each reference one or more additional sub-tasks (i.e., child pages) to be completed in a variety of independent and/or dependent orders, and/or can be filled out by one or even multiple users. To this end, therefore, the user request can further include user login information, account information, shared secrets, biometric data, digital certificates, or the like.

FIG. 2 also shows that the method from the perspective of a client computer system comprises an act 210 of receiving rendering information from the process engine for a page of a process. Act 210 includes receiving rendering information from a process engine for an parent page of a process instance associated with the guided process, wherein the parent page comprises one or more child page references. For example, as shown in FIGS. 1A and 1B, user interface 103 receives rendering information 140 from process engine 110, while user interface 104 receives rendering information 150 from process engine 110. The rendering information, when displayed, indicates a plurality of references (e.g., sets of items 123, 130, 135) to be completed by one or more users.

In addition, FIG. 2 shows that the method from the perspective of a client computer system can comprise an act 220 of selecting a child page referenced by the parent page. Act 220 includes, sending one or more input selections for a child page corresponding to at least one of the one or more child page references found on the parent page. For example, user 105 opens parent page 100*a* through user interface 103, and selects a link to item 125*a*, which brings up a new child page (not shown) to be completed.

Furthermore, FIG. 2 shows that the method from the perspective of a client computer system comprises an act 230 of sending input on the child page referenced by the parent page. Act 230 includes sending input on the selected child page, wherein the input satisfies one or more user input data fields in the child page. For example, user 105 (e.g., a loan applicant) prepares and sends input 145 to process engine 110 through user interface 103, where input 145 can include input on child pages 125*a-c*, and 133*a* or *b*. Similarly, or alternatively, user 107 prepares and sends input 150 to process engine 110 through user interface 104, where input 150 can include input on child pages 137*a-c*.

Still further, FIG. 2 shows that the method from the perspective of a client computer system can comprise an act 240 of receiving alternate rendering information for the parent page. Act 240 includes, upon sending a request to navigate back to the parent page of the process instance, receiving alternate rendering information that displays the parent page but indicates that the child page corresponding to the at least one child page reference has been completed. For example, process engine 110 evaluates any or both of inputs 145/150, and replies with new rendering information 143, 147, which is received at user interfaces 103, 104, respectively. The new, alternate rendering information for the parent page causes a new version of the parent page (i.e., 100*a*) to be displayed at the appropriate user interface.

By contrast, FIG. 2 shows that a method from the perspective of process engine 110 comprises an act 250 of receiving a user request for a guided process. Act 250 includes receiving one or more user requests to create a process instance of a guided process application. For example, process engine 110 receives a request from user 105 to open guided process 120, which in turn includes a series of parent pages (or tasks/steps) to be completed. Completing each parent page may further involve completing several child tasks (or pages/activities) in an order or sequence dictated by the guided process definitions. As previously mentioned, the request can include user identification information for the user, such as the URL of user interface 103, username and password for user 105, shared secret information, a digital certificate. Process engine 110 can then combine this information with one or more definitions received from data store 115 that correspond to the requested guided process 120, and thus create process instance 165 thereof.

FIG. 2 also shows that the method from the perspective of process engine 110 comprises an act 260 of sending rendering information for a page of the guided process. Act 260 includes sending rendering information for a page of the process instance to a client computer system, wherein the page includes a displayed reference to a plurality of child pages. For example, after opening process instance 165, process engine 110 sends rendering information to each appropriately-requesting user/user interface 103, 104. As shown in FIG. 1B, for example, process engine 110 sends rendering information 140 to user interface 103 for user 105, and further sends rendering information 150 to user interface 104 for user 107. In this case, the rendering information pertains to the display of parent page 100*a* (e.g., a "first" or "initial" page of process 120).

In addition, FIG. 2 shows that the method from the perspective of process engine 110 comprises an act 270 of receiving client input on a child page referenced by the parent page. Act 270 includes receiving from the client computer system one or more user inputs regarding at least one of the plurality of child pages. For example, process engine receives inputs 145 and 155 from users 105 and 107, respectively, which include the user's activity, entering and completion, or otherwise execution of child pages (e.g., sets of items 123, 130, 135) referenced on the parent page 100*a*.

Furthermore, FIG. 2 shows that the method from the perspective of process engine 110 comprises an act 280 of sending alternate rendering information to the client computer system. Act 280 includes, upon receiving a navigation request from the client computer system to return to the parent page, sending alternative rendering information for the page indicating that the criterion of the child page has been satisfied. For example, process engine 110 compares the received inputs 145, 155 from user interfaces 103, 104 with the definitions in process instance 165, and executes the input in accordance therewith. If the child pages have been properly executed (e.g., one or more required criterion of any or each child page has been satisfied), process engine 110 then sends alternate rendering information back to the corresponding client interfaces, which causes the display of an updated version of the parent page (i.e., now as page 100*b*).

Accordingly, implementations of the present invention provide a number of components, schematics, and methods for executing tasks of a given page of a guided process in parallel. In particular, each time a user selects a child page referenced on a parent page of a guided process, and successfully executes the child page, the user is returned to an updated version of the parent page. That is, upon receiving navigation requests back to the parent page, the process engine 110 can send new, updated rendering information. The user, therefore, simply believes the user is navigating back to the parent page, but finds that the parent page has been updated to clearly indicate what tasks/child pages have already been executed, whether by the user or by an appropriate third party. As such, implementations of the present invention provide much more efficient, intuitive mechanisms for guiding one or more users through various pages of a given process.

The embodiments of the present invention may comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a client computer system in a computerized environment comprising a plurality of client computer systems, one or more process engines and one or more data stores, a method of executing one or more pages of a guided process with parallel processing, such that navigation of each of one or more parent pages or steps in the guided process clearly indicates what tasks remain to be performed for each of the one or more parent pages, comprising the acts of:
- a client computer, having a processor and memory, sending a request to a process engine to open a guided process, wherein the request includes user identification information for a user;
- receiving, at the client computer, rendering information from the process engine, the rendering information corresponding to a parent page in a process instance of the guided process, wherein the parent page includes one or more child page references wherein each child page reference links to a child page having one or more fields for receiving user input to complete an activity associated with the child page;
- displaying the parent page on the client computer using the rendering information such that each of the one or more child page references is displayed;
- upon the user selecting one of the child page references, displaying the child page including the one or more fields for receiving user input;
- upon the user supplying input for at least one of the one or more fields, sending the input to the process engine, wherein the input completes the activity associated with the child page;
- in response to supplying the input to the process engine, receiving alternate rendering information from the process engine, the alternate rendering information corresponding to the parent page; and
- displaying the parent page on the client computer using the alternate rendering information, wherein the alternate rendering information causes the parent page to be displayed with an indication that the child page has been completed.

2. The method as recited in claim 1, wherein each of the child page references on the parent page link to a child page that is to be completed by the user.

3. The method as recited in claim 1, further comprising receiving second alternate rendering information from the process engine, the second alternate rendering information corresponding to the parent page, wherein the second alternate rendering information is generated in response to receiving input from a second user that completes an activity associated with a second child page; and
- displaying the parent page on the client computer using the second alternate rendering information, wherein the second alternate rendering information causes the parent page to be displayed with an indication that the second child page has been completed.

4. The method as recited in claim 1, wherein less than all of the child page references on the parent page link to a child page that is to be completed by the user and the remaining child page references on the parent page link to a child page that is to be completed by a second user.

5. The method as recited in claim 1, wherein the child page references correspond to a plurality of child pages to be completed in a specified order, and to a plurality of child pages to be completed in any order.

6. The method as recited in claim 1, wherein the child page references that link to a child page that is to be completed by the user are associated with a displayed indication that the corresponding child pages need to be completed by the user.

7. The method as recited in claim 1, wherein the child page references that link to a child page that is to be completed by the second user are associated with a displayed indication that the corresponding child pages need to be completed by the second user.

8. The method as recited in claim 1, further comprising the acts of:
- closing the parent page after displaying the parent page on the client computer using the alternate rendering information;
- opening a new user interface and requesting the parent page through the new user interface; and
- receiving the alternate rendering information through the new user interface and displaying the parent page through the new user interface using the alternate rendering information.

9. The method as recited in claim 1, further comprising sending to the process engine user identification information for the user along with the input sent for the child page, such that the process engine associates the input for the child page with the user identification information.

10. At a process engine in a computerized system comprising one or more client computer systems and a data store that includes one or more definitions for corresponding one or more guided process applications, a method of executing in a parallel fashion one or more tasks one or more parent pages of the guided process with input from one or more users, such that only those tasks or child pages remaining to be completed for each of the one or more parent pages are displayed, comprising the acts of:
- a process engine, having a processor and memory, receiving a user request from a client computer to create a process instance of a guided process;
- sending, to the client computer, rendering information corresponding to a parent page of the process instance, wherein the parent page includes one or more child page references wherein each child page reference links to a child page having one or more fields for receiving user input to complete an activity associated with the child page such that the client computer displays the parent page using the rendering information such that each of the one or more child page references is displayed, and such that upon the user selecting one of the child page references, the corresponding child page is displayed including the one or more fields for receiving user input;
- receiving from the client computer input that the user supplied for at least one of the one or more fields of the child page, wherein the input completes the activity associated with the child page;
- upon receiving the input, sending alternate rendering information to the client computer, the alternate rendering information corresponding to the parent page such that the client computer displays the parent page using the alternate rendering information, wherein the alternate rendering information causes the parent page to be displayed with an indication that the child page has been completed.

11. The method as recited in claim 10, further comprising upon receiving the input, determining that the input completes the activity associated with the child page.

12. The method as recited in claim 10, further comprising sending one or more requests to a data store for one or more definitions corresponding to the requested guided process.

13. The method as recited in claim 10, further comprising creating the process instance of the guided process based on the one or more definitions corresponding to the guided process and on user identification information identified in the user request.

14. The method as recited in claim 10, wherein the one or more definitions indicate that a specific user that is different from the user from which the user request originated is to complete a specific child page of the one or more child pages.

15. The method as recited in claim 10, wherein the one or more definitions indicate a set of child pages that need to be completed in a particular order, a set of child pages that can be completed in any order, and a set of child pages where less than all of the set of child pages can be completed.

16. The method as recited in claim 10, wherein the rendering information comprises instructions that, when displayed, indicate that all of a first set of child pages need to be completed by the user.

17. The method as recited in claim 10, wherein the rendering information comprises instructions that, when displayed, indicate that only part of a second set of child pages need to be completed by the user.

18. The method as recited in claim 10, wherein the rendering information comprises instructions that, when displayed, indicate that a second set of child pages need to be completed by a different user.

19. The method as recited in claim 10, further comprising an act of updating state values for the process instance at a remote date store, wherein the state values include input received from and associated with a plurality of different users for the process instance.

20. At a process engine in a computerized system comprising one or more client computer systems and a data store that includes one or more definitions of a guided process, a computer program storage product having computer-executable code stored thereon that, when executed, cause one or more processors in a computer system implementing the process engine to perform a method comprising:

a process engine, having a processor and memory, receiving a user request from a client computer to create a process instance of a guided process;

sending, to the client computer, rendering information corresponding to a parent page of the process instance, wherein the parent page includes one or more child page references wherein each child page reference links to a child page having one or more fields for receiving user input to complete an activity associated with the child page such that the client computer displays the parent page using the rendering information such that each of the one or more child page references is displayed, and such that upon the user selecting one of the child page references, the corresponding child page is displayed including the one or more fields for receiving user input;

receiving from the client computer input that the user supplied for at least one of the one or more fields of the child page, wherein the input completes the activity associated with the child page;

upon receiving the input, sending alternate rendering information to the client computer, the alternate rendering information corresponding to the parent page such that the client computer displays the parent page using the alternate rendering information, wherein the alternate rendering information causes the parent page to be displayed with an indication that the child page has been completed.

\* \* \* \* \*